United States Patent Office.

LOUIS WALTHER, OF NEW YORK, N. Y.

Letters Patent No. 95,858, dated October 12, 1869.

IMPROVED MEDICATED CIGAR.

The Schedule referred to in these Letters Patent and making part of the same.

To all whom it may concern:

Be it known that I, LOUIS WALTHER, of the city of New York, in the county and State of New York, have invented a new and useful Improvement in Medicated Cigars; and I do hereby declare that the following is a full, clear, and exact description thereof, which will enable others skilled in the art to make and use the same.

This invention relates to improvements in cigars; and

It consists in imparting an improved flavor to them and in expelling the nicotine, by steeping the tobacco-leaves, previous to being formed into cigars, in a liquor formed of the following substances:

Harliar., Asperula odorata, Flores lavandulæ, Radix iridis, and Flores Tilliar., two and a half parts each, in a sufficient quantity of water, in which I place one hundred pounds of tobacco-leaves, and let them stand over night, or ten to twelve hours, which has the effect to expel the nicotine of the tobacco, to a considerable extent, and to impart a mild and pleasant flavor to the tobacco, very much improving the taste of the smoke.

From the tobacco-leaves so prepared, I make cigars having an improved flavor, and possessing, to a considerable extent, the healthful qualities of the plants.

Having thus described my invention,

I claim as new, and desire to secure by Letters Patent—

As a new article of manufacture, medicated cigars, made from tobacco-leaves treated in an infusion of the substances herein described, substantially as specified.

The above specification of my invention signed by me, this 12th day of August, 1869.

LOUIS WALTHER.

Witnesses:
 GEO. W. MABEE,
 ALEX. F. ROBERTS.